J. MANN.
COOKING AND DOMESTIC UTENSIL HEATED BY ELECTRICITY.
APPLICATION FILED DEC. 17, 1912.

1,062,344.

Patented May 20, 1913.

2 SHEETS—SHEET 1.

WITNESSES
H. M. Meyer.
Floyd R. Cornwall.

INVENTOR
J. Mann.

Attorney

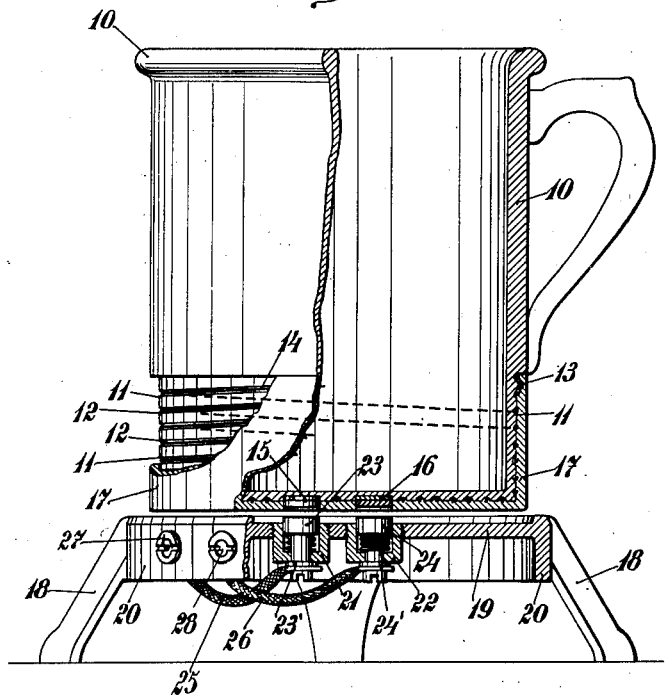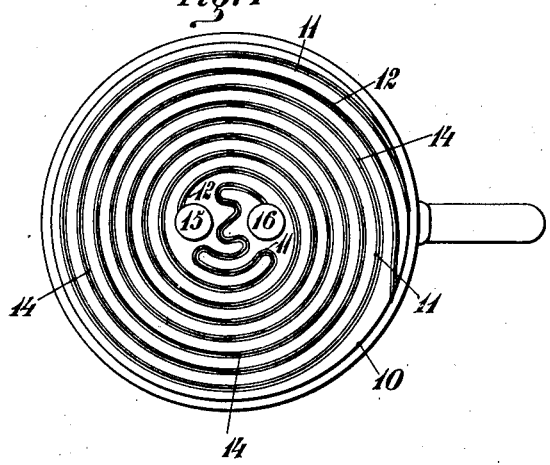

UNITED STATES PATENT OFFICE.

JAN MANN, OF PRAGUE, AUSTRIA-HUNGARY.

COOKING AND DOMESTIC UTENSIL HEATED BY ELECTRICITY.

1,062,344.  Specification of Letters Patent. Patented May 20, 1913.

Application filed December 17, 1912. Serial No. 737,271.

*To all whom it may concern:*

Be it known that I, JAN MANN, subject of the Austro-Hungarian Emperor, residing at Kostelni 363, Prague, VII, Bohemia, Austria-Hungary, have invented certain new and useful Improvements in Cooking and Domestic Utensils Heated by Electricity, of which the following is a specification.

The device of my invention is illustrated in the accompanying drawings in two embodiments, which will be more fully described in connection with the drawings and which will be more particularly pointed out in and by the appended claim.

Figure 1:
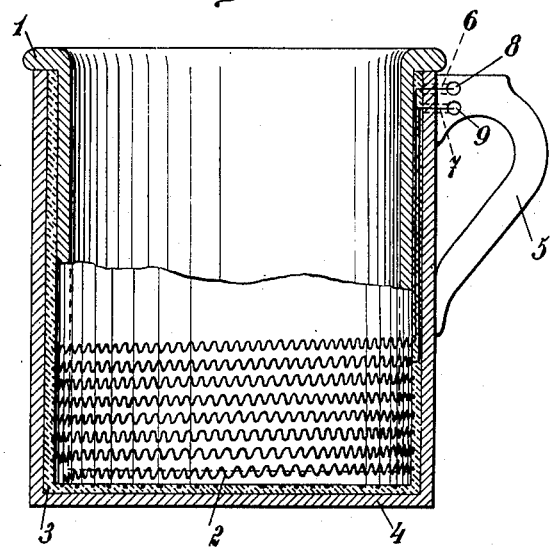
Figure 2:
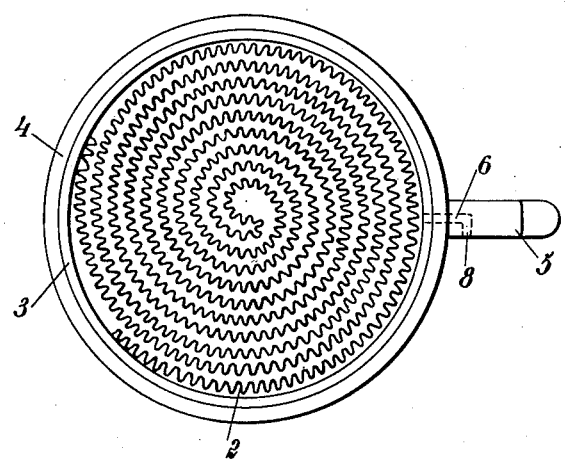

In the drawings: Figure 1 is a vertical sectional view showing one embodiment of my invention. Fig. 2 is a plan view thereof, with the inner pot removed. Fig. 3 is a view partly in vertical section and partly in elevation of a further embodiment of my invention. Fig. 4 is an under side plan view thereof.

In the construction shown in Figs. 1 and 2, 1 designates a cooking pot of clay or porcelain on the outer surface of which are disposed coils of bare, not insulated conducting resistance wire 2. The wire 2 is laid out in double spirals so that it covers the lower part of the outer cylindrical surface and the outer bottom surface of the pot 1. In order to attain the longest possible heating length of the conducting wire, the spirals in which the same is laid out, have preferably an undulating or zigzag course. Both the end portions of the wire 2 are laid vertically along the cylindrical surface of the pot 1 almost to its upper rim. When the wire has been laid out on the outer surface of the pot 1, the same is coated with a layer 3 of clay or porcelain-clay, so that the bare coils of the wire are completely embedded in and surrounded by ceramic mass which at the same time prevents them from shifting about or establishing short circuit. The pot 1 with its coating 3 is slipped into an outer pot 4 of clay, porcelain, or any other suitable material which protects the coating 3 from cracking off or from being knocked off the surface of the inner pot 1. The outer pot 4 has a handle 5 attached and is provided with two channels 6, 7 through which are passed the end portions of the wire 2, which are bent off perpendicularly to the cylindrical surface of the pot 1. The channels 6, 7 are arranged vertically above each other and are continued into the body of the handle 5, where they are bent off in right angle in the horizontal plane and form openings 8, 9 which are adapted to receive known plug contacts of an electrical circuit. By introducing the known plug contacts into these openings 8, 9 an electrical circuit is established in the wire 2 and the heat generated by overcoming the resistance of the wire is transmitted to the inner pot 1, which is rapidly and uniformly heated.

Instead of disposing the coils of the resistance wire on the outer surface of the inner pot the same can be embedded in spiral grooves cut in the cylindrical outer surface and in the outer bottom surface of the inner pot. This form is illustrated in Figs. 3 and 4 of the appended drawings. 10 designates a pot of clay or porcelain the cylindrical lower portion of which is outwardly set off and provided with double spiral grooves 11, 12. The latter are interconnected at their upper ends by a short cross-groove, under which a projection 13 is provided in order to secure more efficaciously the wire 14, which is placed in the grooves 11, 12 and their interconnecting cross-groove, where it forms a loop, and thereby prevents from slipping out of these grooves while it is being laid out. Both the spiral grooves 11, 12 are continued on the outer bottom surface of the pot 10, and open each into a circular cavity, into which metal contact disks 15, 16 are secured. The end portions of the wire 14 are each connected with one of these contact disks 15, 16. The set off portion of the cylindrical outer surface of the pot 1 as well as the outer bottom surface are coated with a layer 17 of clay or porcelain-clay, the cylindrical outer surface of which is flush with that of the smooth upper portion of the pot 10. This coating penetrates into the grooves 11, 12, where it surrounds completely the bare wire coils embedded therein, and coheres by means of these spiral projections firmly on the outer surface of the pot 10. This coating 17 is provided with circular openings for the contact plates 15, 16. For the purpose of introducing electrical current into the wire 14 a stand 18 of iron, clay, porcelain or other suitable material is used, which contains a circular plate 19, on which the pot 10 can be placed. In the plate 19 are two circular openings with inner threads in which insulating screw-stoppers 21, 22 made of non-conductive material and provided with outer threads are screwed. 23, 24 are contact-disks which are slidably guided in the inner cavities of the stoppers 21, 22 and are acted upon by springs, the lower ends of which bear against the bottoms of the stoppers 21, 22. The off-set portions of the contact pieces 23, 24 are slidably guided in circular openings provided in the bottom of the stoppers 21, 22 and have on their outer ends flanges 23', 24', which serve to limit their sliding movement. To the outer ends of the contact pieces 23, 24 are connected in the known manner, by means of screws, short cables 25, 26, the other ends of which are connected to insulated tubes 27, 28 inserted in the outer rim 20 of the stand 18. These tubes 27 28 are adapted to receive the known plug contacts of an electrical circuit, so that by inserting these plug contacts in the openings 27, 28 the contact pieces 23, 24 are connected to the two ends of an electrical circuit. The pot 10 is then placed on the plate 19 so that the disks 23, 24 bear against the disks 15, 16 while the action of the springs bearing against the disks 23, 24 insures complete contact of the disks 15, 16 on one side and of disks 25, 26 on the other side. As soon as this contact is established, electric current is introduced into the coils of the wire 14 and the heat thus generated is transmitted to the inner pot 10.

The heating appliance according to this invention can be used for cooking, boiling, frying and the like culinary purposes, and also for other domestic uses.

I am aware that prior to my invention cooking and domestic utensils heated by electricity were known and I do not claim such a combination broadly, but

What I claim and desire to secure by Letters Patent is:

In a device for heating by means of electricity, the combination with an inner cylindrical shell open at its top, of an upper portion, a relatively thinner lower portion, an electric heating medium, grooves in said thinner portion adapted to receive said electric heating medium, a coating upon said thinner portion adapted to fill the grooves containing the heating medium, and to fill the space between the vertical surface plane of the upper portion and the lower portion, and means carried by the heating medium and contained within the thinner portion and the coating to receive electric contact terminals.

In testimony whereof I affix my signature in presence of two witnesses.

JAN MANN.

Witnesses:
   JAN B. VOJÁČEK,
   VIJTER ROPEDY.